US009686480B2

(12) United States Patent
Kusanagi

(10) Patent No.: US 9,686,480 B2
(45) Date of Patent: Jun. 20, 2017

(54) IMAGE GENERATION APPARATUS, VEHICLE, CONTROL METHOD OF IMAGE GENERATION APPARATUS AND STORAGE MEDIUM THAT SET AN ADJUSTMENT TARGET VALUE OF EMISSION LIGHT INTENSITY

(71) Applicant: Masato Kusanagi, Kanagawa (JP)

(72) Inventor: Masato Kusanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 376 days.

(21) Appl. No.: 14/454,221

(22) Filed: Aug. 7, 2014

(65) Prior Publication Data

US 2015/0062345 A1    Mar. 5, 2015

(30) Foreign Application Priority Data

Aug. 30, 2013    (JP) .................................. 2013-178915

(51) Int. Cl.
*H04N 5/30* (2006.01)
*G02B 5/20* (2006.01)
(Continued)

(52) U.S. Cl.
CPC ............... *H04N 5/30* (2013.01); *G02B 5/205* (2013.01); *G02B 26/105* (2013.01); *G02B 27/01* (2013.01);
(Continued)

(58) Field of Classification Search
None
See application file for complete search history.

(56) References Cited

U.S. PATENT DOCUMENTS

2005/0078169 A1*  4/2005  Tumer ..................... B41J 2/471
                                                         347/260
2008/0129892 A1   6/2008  Sakaguchi et al.
(Continued)

FOREIGN PATENT DOCUMENTS

JP        11-109273 A        4/1999
JP        2006-058642        3/2006
(Continued)

OTHER PUBLICATIONS

Extended European Search Report issued on Feb. 17, 2015 in European Patent Application No. 14182690.9.

*Primary Examiner* — Jay Patel
*Assistant Examiner* — Shadan E Haghani
(74) *Attorney, Agent, or Firm* — Oblon, McClelland, Maier & Neustadt, L.L.P.

(57) ABSTRACT

An image generation apparatus for generating an image includes a light source device; an optical deflection device to deflect laser beam from the light source device to a scanned face and a light detector; a light quantity adjustment device including a member disposable on a light path of the laser beam between the light source device and the optical deflection device; an emission light intensity adjustment unit to adjust emission light intensity of the light source device; and a controller to set a first adjustment target value of emission light intensity and an adjustment target value of light quantity when laser beam is deflected to the scanned face based on target luminance of the image, and a second adjustment target value of emission light intensity when laser beam is deflected to the light detector based on an adjustment target value of light quantity and detection sensitivity of the light detector.

13 Claims, 11 Drawing Sheets

(51) Int. Cl.
*G02B 27/01* (2006.01)
*G02B 26/10* (2006.01)

(52) U.S. Cl.
CPC ............ *G02B 2027/0112* (2013.01); *G02B 2027/0118* (2013.01)

(56) References Cited

U.S. PATENT DOCUMENTS

| | | | |
|---|---|---|---|
| 2009/0244407 A1* | 10/2009 | Sakakibara | H04N 9/3194 348/759 |
| 2009/0314927 A1 | 12/2009 | Tatsuno et al. | |
| 2011/0140625 A1* | 6/2011 | Van Casteren | H05B 41/38 315/246 |
| 2012/0092630 A1 | 4/2012 | Furuichi et al. | |
| 2014/0152711 A1* | 6/2014 | Sekiya | G03B 21/00 345/690 |
| 2015/0260984 A1* | 9/2015 | Yamakawa | H04N 9/3129 345/591 |

FOREIGN PATENT DOCUMENTS

| | | |
|---|---|---|
| JP | 2012-155019 | 8/2012 |
| JP | 2013-015738 | 1/2013 |
| JP | 2013-101210 | 5/2013 |
| JP | 2013-187822 | 9/2013 |
| WO | WO2011/013240 A1 | 2/2011 |

* cited by examiner

FIG. 8

| TARGET LUMINANCE Lm | METHOD | TRANSMITTANCE Tn | DRIVE CURRENT VALUE Ik | |
|---|---|---|---|---|
| | | | IMAGE DRAWING AREA | MARKER AREA |
| L8 | MECHANICAL | T5 | I4 | I4 |
| L7 | MECHANICAL | T4 | I4 | I4 |
| L6 | MECHANICAL | T3 | I4 | I4 |
| L5 | MECHANICAL | T2 | I4 | I4 |
| L4 | MECHANICAL | T1 | I4 | I4 |
| L3 | ELECTRICAL | T1 | I3 | I4 |
| L2 | ELECTRICAL | T1 | I2 | I4 |
| L1 | ELECTRICAL | T1 | I1 | I4 |

IMAGE GENERATION APPARATUS, VEHICLE, CONTROL METHOD OF IMAGE GENERATION APPARATUS AND STORAGE MEDIUM THAT SET AN ADJUSTMENT TARGET VALUE OF EMISSION LIGHT INTENSITY

This application claims priority pursuant to 35 U.S.C. §119(a) to Japanese Patent Application No. 2013-178915, filed on Aug. 30, 2013 in the Japan Patent Office, the disclosures of which are incorporated by reference herein in their entirety.

BACKGROUND

Technical Field

The present invention relates to an image generation apparatus, a vehicle, and a control method of an image generation apparatus, and more specifically, an image generation apparatus that generates an image on a scanned face using laser beam scanning, a vehicle including the image generation apparatus, and a control method of the image generation apparatus.

Background Art

Typically, a headup display apparatus includes, for example, a semiconductor laser, a light quantity adjustment device (e.g., liquid crystal panel) disposed on a light path of laser beam emitted from the semiconductor laser to adjust light quantity of the laser beam based on target luminance of display image, and an optical deflection device (e.g., MEMS scanner) to deflect the laser beam having adjusted with light quantity by the light quantity adjustment device toward a scanned face (e.g., surface of a translucent screen) and a light detector (e.g., color sensor) as disclosed in JP-2013-15738-A. However, as to conventional headup display apparatuses, laser beam may not be detected effectively by the light detector depending on levels of target luminance.

SUMMARY

In one aspect of the present invention, an image generation apparatus for generating an image by scanning a scanned face using laser beam is devised. The image generation apparatus includes a light source device having at least one semiconductor laser; an optical deflection device to deflect laser beam from the light source device to the scanned face and a light detector; a light quantity adjustment device including a member disposable on a light path of the laser beam between the semiconductor laser and the optical deflection device to adjust light quantity of the laser beam; an emission light intensity adjustment unit to adjust emission light intensity of the semiconductor laser; and a controller to set a first adjustment target value of the emission light intensity, which is an adjustment target value of the emission light intensity, and an adjustment target value of the light quantity when laser beam is deflected to the scanned face by the optical deflection device based on target luminance of the image, and a second adjustment target value of the emission light intensity, which is an adjustment target value of the emission light intensity, when laser beam is deflected to the light detector by the optical deflection device based on an adjustment target value of the light quantity and detection sensitivity of the light detector.

In another aspect of the present invention, a method of controlling of an image generation apparatus generating an image by scanning a scanned face using laser beam is devised. The image generation apparatus includes a light source device having at least one semiconductor laser; an optical deflection device to deflect laser beam from the light source device to the scanned face and a light detector; a light quantity adjustment device including a member disposable on a light path of the laser beam between the semiconductor laser and the optical deflection device to adjust light quantity of the laser beam; an emission light intensity adjustment unit to adjust emission light intensity of the semiconductor laser, the method includes: setting a first adjustment target value of the emission light intensity which is an adjustment target value of the emission light intensity and adjustment target value of the light quantity when laser beam is deflected to the scanned face by the optical deflection device based on target luminance of the image; and setting a second adjustment target value of the emission light intensity which is an adjustment target value of the emission light intensity when laser beam is deflected to the light detector by the optical deflection device based on an adjustment target value of the light quantity and detection sensitivity of the light detector.

In another aspect of the present invention, a non-transitory computer-readable storage medium storing a program that, when executed by a computer having a processing circuit, causes the computer to execute a method of controlling of an image generation apparatus generating an image by scanning a scanned face using laser beam is devised. The image generation apparatus includes a light source device having at least one semiconductor laser; an optical deflection device to deflect laser beam from the light source device to the scanned face and a light detector; a light quantity adjustment device including a member disposable on a light path of the laser beam between the semiconductor laser and the optical deflection device to adjust light quantity of the laser beam; an emission light intensity adjustment unit to adjust emission light intensity of the semiconductor laser, the method includes: setting a first adjustment target value of the emission light intensity which is an adjustment target value of the emission light intensity and adjustment target value of the light quantity when laser beam is deflected to the scanned face by the optical deflection device based on target luminance of the image; and setting a second adjustment target value of the emission light intensity which is an adjustment target value of the emission light intensity when laser beam is deflected to the light detector by the optical deflection device based on an adjustment target value of the light quantity and detection sensitivity of the light detector.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a table showing a relationship of target luminance, adjustment target value of transmittance and adjustment target value of drive current;

Figure 1:
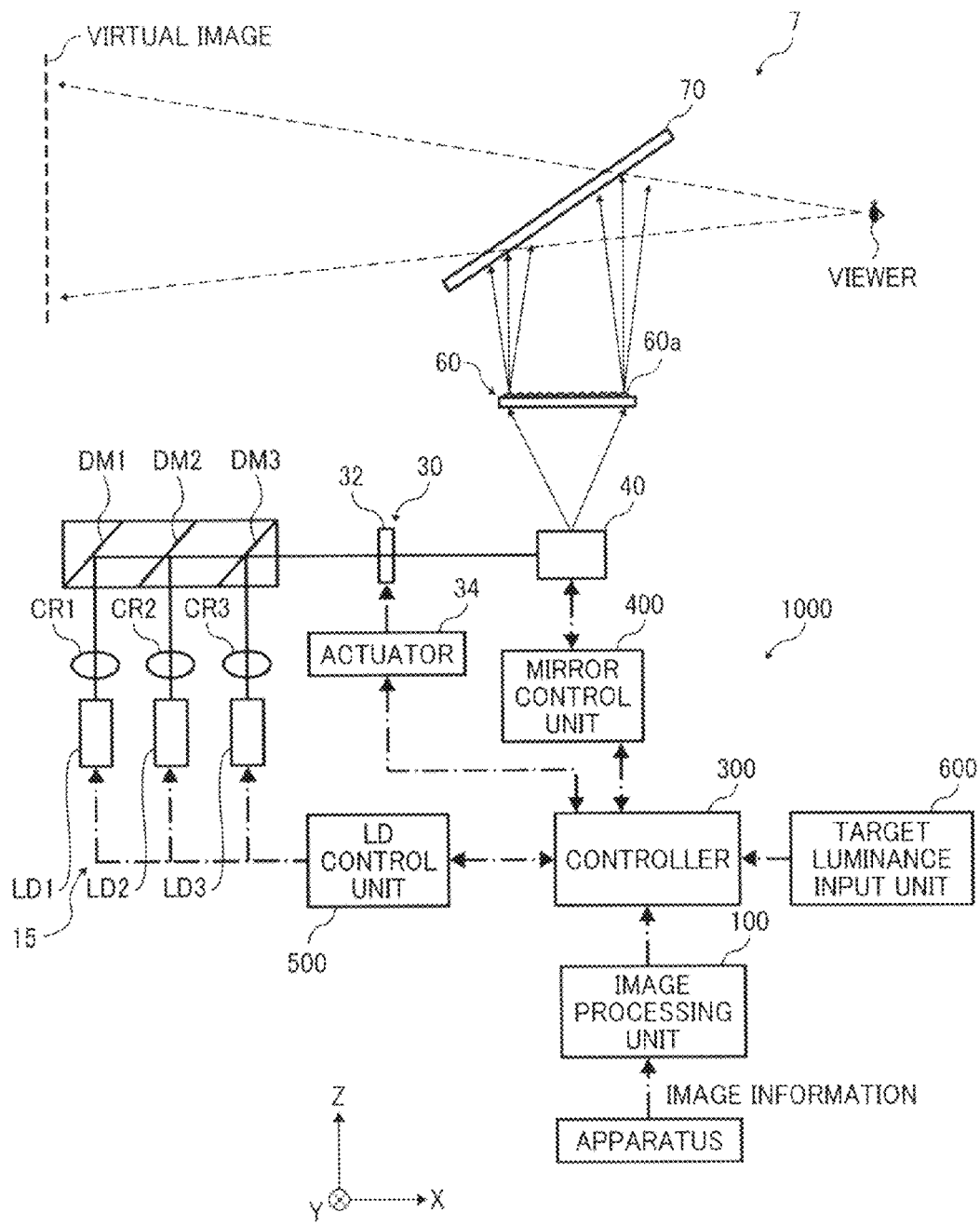
FIG. 1 is a schematic configuration of a headup display apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, an apparatus or system according to an example embodiment is described hereinafter.

A description is given of an example embodiment with reference to FIG. 1 to FIG. 8. FIG. 1 is a schematic configuration of a headup display apparatus 7, which is an example of an image generation apparatus according to an example embodiment. In this description, XYZ three dimensional orthogonal coordinate system is used by setting Z-axis direction as the vertical direction as illustrated in FIG. 1 and other drawings, and the headup display apparatus 7 may be also referred to as the HUD apparatus 7.

The HUD apparatus 7 can be equipped to, for example, automobiles, air planes, ships or the like (hereinafter, referred to as "vehicle"), with which a driver or operator (hereinafter referred to as "driver") can view information of driving, operation, or running (hereinafter referred to as "driving") of the vehicle through a windshield of the vehicle.

As illustrated in FIG. 1, the HUD apparatus 7 includes, for example, a light source device 15, a light quantity adjustment device 30, an optical deflection device 40, a lens array 60, a semi-translucent member 70, a light detector 150 (FIG. 4), a control unit 1000, and an operation panel.

The light source device 15 includes, for example, three laser diodes LD1 to LD3, three collimate lenses CR1 to CR3, and three dichroic mirrors DM1 to DM3. The laser diode is, for example, an edge emitting laser, which is one type of semiconductor lasers.

The laser diode LD1 is, for example, red laser disposed at a position to emit red light (wavelength of 640 nm) to +Z direction.

The laser diode LD2 is, for example, blue laser disposed at +X side position of the laser diode LD1 to emit blue light (wavelength of 450 nm) to +Z direction.

The laser diode LD3 is, for example, green laser disposed at +X side position of the laser diode LD2 to emit green light (wavelength of 520 nm) to +Z direction.

The collimate lens CR1 is, for example, disposed at +Z side of the laser diode LD1 to set red light emitted from the laser diode LD1 to substantially parallel light.

The collimate lens CR2 is, for example, disposed at +Z side of the laser diode LD2 to set blue light emitted from the laser diode LD2 to substantially parallel light.

The collimate lens CR3 is, for example, disposed at +Z side of the laser diode LD3 to set green light emitted from the laser diode LD3 to substantially parallel light.

Each of the three dichroic mirrors DM1 to DM3 is made of, for example, a thin film such as dielectric multilayer that reflects light having specific wavelength and passes through light having other wavelength.

The dichroic mirror DM1 is, for example, disposed at +Z side of the collimate lens CR1 while slanted, for example, 45 degrees with respect to X-axis and Z-axis to reflect red light coming from the collimate lens CR1 to +X direction.

The dichroic mirror DM2 is, for example, disposed at +X side of the dichroic mirror DM1 and at +Z side of the collimate lens CR2 while slanted, for example, 45 degrees with respect to X-axis and Z-axis to pass through red light coming from the dichroic mirror DM1 to +X direction, and to reflect blue light coming from the collimate lens CR2 to +X direction.

Further, red light coming from the dichroic mirror DM1 and blue light coming from the collimate lens CR2 enter near the center of the dichroic mirror DM2.

The dichroic mirror DM3 is, for example, disposed at +X side of the dichroic mirror DM2 and at +Z side of the collimate lens CR3 while slanted, for example, 45 degrees with respect to X-axis and Z-axis to pass through red light and blue light coming from the dichroic mirror DM2 to +X direction, and to reflect green light coming from the collimate lens CR3 to +X direction.

Further, red light and blue light coming from the dichroic mirror DM2 and green light coming from the collimate lens CR3 enter near the center of the dichroic mirror DM3.

Three lights (i.e., red light, blue light and green light) passing the dichroic mirror DM3 are synthesized as one light, in which the color of synthesized light can be generated based on balance of emission light intensity of the three laser diodes LD1 to LD3.

Therefore, the light source device 150 emits a laser beam (i.e., synthesized light) synthesizing three laser beams from the three laser diodes LD1 to LD3 to +X direction.

The light quantity adjustment device 30 includes, for example, a light adjustment member 32 and an actuator 34. The light adjustment member 32 is disposed on a light path of laser beam (i.e., synthesized light) coming from the light source device 15 such as +X side of the dichroic mirror DM3. The actuator 34 drives the light adjustment member 32 in Y-axis direction.

Figure 5:
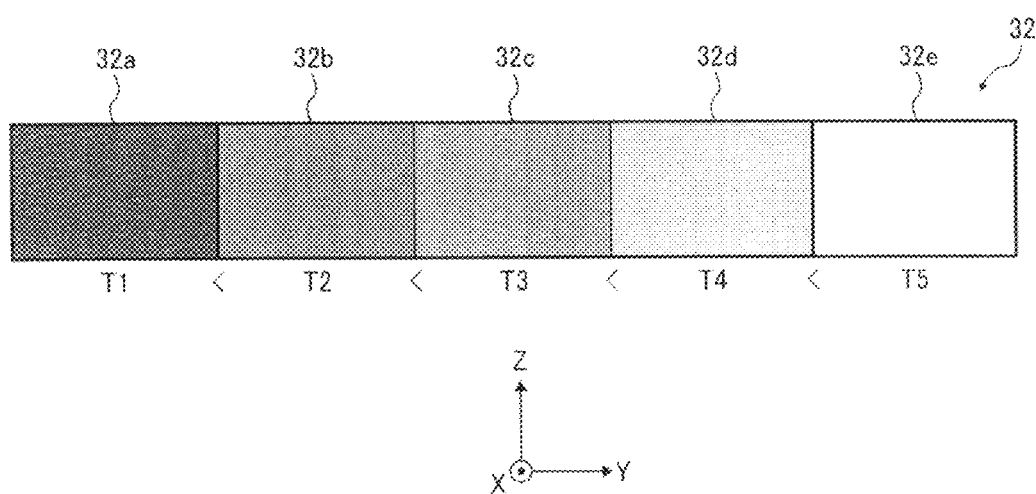
FIG. 5 is one example of a light adjustment member of a light quantity adjustment device.

The light adjustment member 32 includes, for example, a plurality of light passing portions 32a to 32e (e.g., five light passing portions) arranged in Y-axis direction while having different transmittance of laser beam with each other as illustrated in FIG. 5. The five light passing portions 32a to 32e are arranged in Y-axis direction with the order of transmittance Tn (n is natural number) of laser beam, and the transmittance Tn of the light passing portions 32a to 32e are respectively set with T1 to T5 having the order of "T1<T2<T3<T4<T5."

The controller 300, to be described later, controls the actuator 34 so that any one of the five light passing portions 32a to 32e is positioned on a light path of laser beam coming from the light source device 15. In this configuration, light quantity of the laser beam coming from the light source device 15 after passing the light adjustment member 32 is reduced compared to light quantity of the laser beam before passing the light adjustment member 32. The controller 300 controls the actuator 34 based on detection information from a sensor that detects position information of the light adjustment member 32 in Y-axis direction.

The actuator 34 can be, for example, a screw-feed device, a rack and pinion device, a linear motor device, a cylinder device that can drive the light adjustment member 32 at least along one axis direction (e.g., Y-axis direction).

Figure 2:
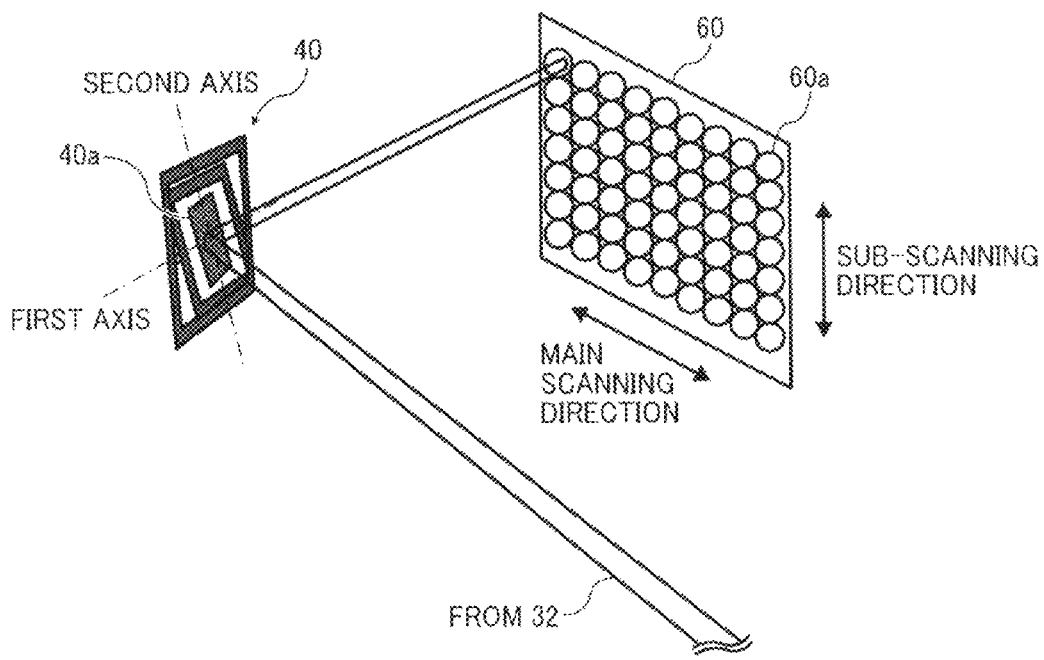
FIG. 2 is a schematic configuration of an optical deflection device and a lens array of FIG. 1.

As illustrated in FIG. 2, the optical deflection device 40 includes, for example, a mirror 40a (e.g. MEMS mirror) disposed on a light path of laser beam passing through the light adjustment member 32. The laser beam entering the mirror 40a can be deflected to the lens array 60 and the light detector 150 (see FIG. 4).

For example, the mirror 40a can independently oscillate about two axes perpendicular to each other, wherein a first axis is parallel to Y-axis, and a second axis is perpendicular to the first axis. The optical deflection device 40 includes the mirror 40a, a mirror drive unit that drives the mirror 40a about each axis, and an angle detector that detects deflection angle of the mirror 40a about each axis. The angle detector outputs a signal corresponding to a deflection angle of the mirror 40a about each axis to a mirror control unit 400 (see FIG. 1) to be described later. The optical deflection device 40 can be manufactured using semiconductor manufacturing technology process such as micro electro mechanical systems (MEMS) process.

The lens array 60 is, for example, disposed on a light path of laser beam deflected by the optical deflection device 40 such as +Z side of the optical deflection device 40. A surface such as a scanned face of the lens array 60 is two-dimensionally scanned by the laser beam in the main scanning direction (direction corresponding to the second axis) and the sub-scanning direction (direction corresponding to the first axis) perpendicular to each other to form an image. For example, the main scanning direction is Y-axis direction, and the sub-scanning direction is X-axis direction. An image formed on a surface of the lens array 60 may be referred to as "projection image."

Figure 3:
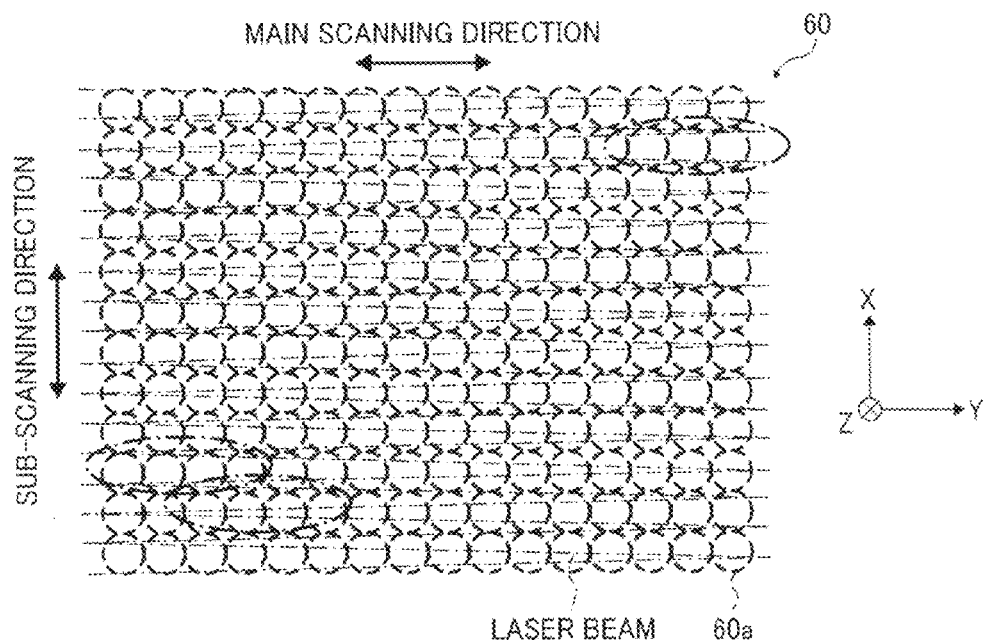
FIG. 3 is an example of a scanning pattern of laser beam on the lens array.

As illustrated in FIGS. 2 and 3, the lens array 60 includes a plurality of micro lenses 60a (see FIG. 1) arranged in matrix or a lattice pattern in X-axis direction and Y-axis direction, wherein each of the micro lenses 60a is a hemisphere lens convex to +Z side. The diameter of each of the micro lenses 60a is set greater than a beam diameter of laser beam. Further, each of the micro lenses 60a is corresponded to one pixel of a projection image. Therefore, the lens array 60 can function as a diffusing plate that diffuses a laser beam corresponding to each pixel of the projection image.

In a configuration of FIG. 1, the semi-translucent member 70 is also referred to as a combiner, and is disposed on a light path of laser beam coming from the lens array 60 such as +Z side of the lens array 60. The semi-translucent member 70 is, for example, a plate disposed while slanted to XY-plane.

A part of the laser beam coming from the lens array 60 passes the semi-translucent member 70, and remaining part of the laser beam is reflected by the semi-translucent member 70. With this configuration, an observer or viewer can view a virtual image, which is an expanded view of an image formed on a surface (i.e., scanned face) of the lens array 60 via the semi-translucent member 70.

If the diffusing plate such as the lens array 60 is not used, laser beam is scattered on the semi-translucent member 70, and the scattered light interferes on retina of the observer or viewer, with which speckle noise occurs. By contrast, by using the lens array 60, a field of view of the observer or viewer can be secured by laser beam diffused by each of the micro lenses 60a, with which speckle noise can be reduced greatly.

To be described later, the light detector 150 is disposed on a light path of laser beam deflected by the optical deflection device 40. The light detector 150 is, for example, a photo diode, a photo transistor or the like. When the light detector 150 detects laser beam deflected by the optical deflection device 40, the light detector 150 outputs a detection result (e.g., light quantity and color information) to the controller 300 to be described later.

As illustrated in FIG. 1, the control unit 1000 includes, for example, an image processing unit 100, the controller 300, a mirror control unit 400, and a laser diode (LD) control unit 500.

The image processing unit 100 conducts various processing such as signal conversion, color correction, distortion correction, resolution conversion, image size conversion corresponding to pixel numbers and frequency for image information transmitted from an image data output apparatus such as personal computer (PC), memory, hard disk, disk player, television conference terminal, tablet terminal, or smart phone, and transmits the processed image information to the controller 300. Further, the above image information includes, for example, information of driving of vehicle.

The controller 300 transmits the image information received from the image processing unit 100 to the LD control unit 500. Further, the controller 300 generates a synchronizing signal based on a signal corresponding to a deflection angle received from the mirror control unit 400, and outputs the synchronizing signal to the LD control unit 500.

Further, based on target luminance input from a target luminance input unit 600 and detection sensitivity of the light detector 150, the controller 300 controls the light quantity adjustment device 30 and the LD control unit 500, in which the controller 300 adjusts projection image luminance at the target luminance, and also adjusts light quantity of laser beam directed to the light detector 150 at a level that can be detected by the light detector 150. The target luminance input unit 600 is to be described later.

In this configuration, based on the target luminance of projection image, the controller 300 sets an adjustment target value of light quantity by the light quantity adjustment device 30 (i.e., transmittance of the light adjustment member 32), and an adjustment target value of emission light intensity by the LD control unit 500 (i.e., drive current value of each laser diode) to be described later. The controller 300 includes a memory used as a storage unit that can store a table (see FIG. 8) having information of combination of transmittance Tn of the light adjustment member 32 and drive current value Ik of each laser diode, which can be used for adjusting projection image luminance to target luminance Lm, and for adjusting light quantity of laser beam deflected to the light detector 150 at a level that can be detected by the light detector 150.

Further, the controller 300 corrects white balance of an image (i.e., projection image) formed on the surface of the lens array 60. For example, the controller 300 adjusts white balance of a projection image based on a correction-use table having pre-stored property of the three laser diodes LD1 to LD3 corresponding to RGB, and coefficient based on property of the light adjustment member 32, and detection result (e.g., light quantity and color information) at the light detector 150, and transmits an adjustment result to the LD control unit 500, and corrects white balance via the LD control unit 500.

The mirror control unit 400 adjusts power to be supplied to the mirror drive unit based on a signal corresponding to a deflection angle of the mirror 40a about each axis received from the angle detector. Further, the mirror control unit 400 transmits the signal corresponding to the deflection angle of the mirror 40a about each axis received from the angle detector to the controller 300.

The LD control unit 500 can adjust emission light intensity (i.e., drive current value) of the three laser diodes LD1 to LD3 independently, generates a modulated signal based on image information from the controller 300, and supplies drive current corresponding to the modulated signal at a given timing after receiving a synchronizing signal from the controller 300 to each of laser diodes. With this configuration, the laser beam modulated based on the image information can be emitted from each of laser diodes under a condition synchronized with a deflection angle of the mirror 40a about each axis. The LD control unit 500 can be used as an emission light intensity adjustment unit.

Further, based on the synchronizing signal from the controller 300, the LD control unit 500 can adjust emission light intensity (i.e., drive current value) of each of laser diodes independently for a first case and a second case, wherein the first case is when the optical deflection device 40 deflects the laser beam to the surface (i.e., scanned face) of the lens array 60, and the second case is when the optical deflection device 40 deflects the laser beam to the light detector 150. For example, drive current value Ik (k is natural number) when laser beam is deflected to an image drawing area can be set any one of "I1" to "I4" set with the order of "I1<I2<I3<I4" (see FIG. 8), and the drive current value Ik when the laser beam is deflected to the light detector 150 is set I4 (see FIG. 8).

In this configuration, the drive current value I4 is set to a given value so that laser beam, emitted from a laser diode supplied with the drive current value I4 and passing the light passing portion 32a having transmittance T1, can be detected by the light detector 150 (i.e., intensity of laser beam is set to a minimum value or more detectable by the light detector 150), which means the drive current value I4 is set based on transmittance T1, and detection sensitivity of the light detector 150.

Further, based on the adjustment result of white balance received from the controller 300, the LD control unit 500 conducts fine adjustment of emission light intensity of each of laser diodes to correct white balance. The fine adjustment can be conducted by adjusting drive current value of at least one laser diode so that drive current value of each of laser diodes becomes a value close to the set drive current value Ik.

Figure 6:
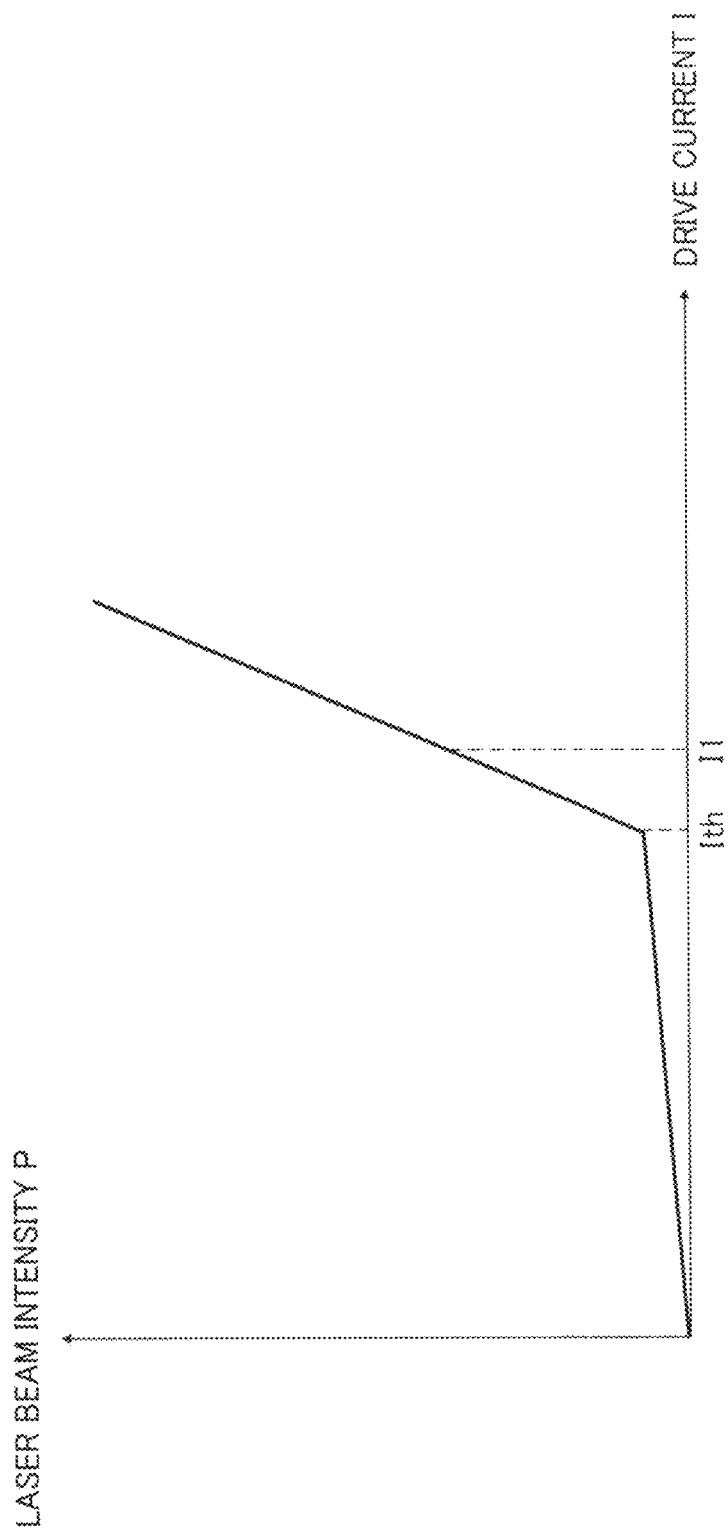
FIG. 6 is a graph showing a relationship of driver current (I) of a laser diode and laser beam intensity (P)

The laser diode has intensity property of laser beam with respect to drive current as illustrated in FIG. 6, in which one current value is set as a threshold value (i.e., threshold current Ith) and property is different in an area of the threshold current "Ith" or more, and an area of the threshold current "Ith" or less. Typically, when a drive current value is the threshold current Ith or more, a relationship of drive current value and intensity property of laser beam can be assumed as linear, and thereby suitable control can be conducted. However, when a drive current value is the threshold current Ith or less, laser emission is not conducted. Further, because a level of threshold current Ith and emission property is different for each of lasers, it is difficult to secure appropriate white balance for a projection image.

Therefore, if target luminance is set less than a given value, it is difficult to adjust projection image luminance and color correctly by only adjusting emission light intensity of laser diode.

In view of such issue, in an example embodiment, even if target luminance is set low (e.g., less than a given value), by combining light quantity adjustment by the light quantity adjustment device 30 and emission light intensity adjustment by the LD control unit 500, luminance adjustment can be conducted using drive current of Ith or more, and projection image luminance and image quality (e.g., white balance) can be adjusted correctly, in which drive current value I1 is set to the threshold current Ith or more (drive current value I1≥threshold current Ith) as indicated in FIG. 6. Further, because the threshold current Ith is different for each of lasers (i.e., variance or fluctuation), the driver current I1 is preferably set slightly greater than the threshold current Ith (i.e., design value). If projection image luminance is to be adjusted at a low luminance area such as several $cd/m^2$ by only adjusting the emission light intensity of the laser diode, drive current is required to be controlled at less than the threshold current Ith, in which it is difficult to correctly adjust projection image luminance and color.

The operation panel includes operation members for setting various settings, and the target luminance input unit 600 (FIG. 1) to input target luminance manually by a driver or user. The target luminance input unit 600 can set target luminance at a plurality of levels (e.g., eight levels of L1 to L8) depending on brightness around the HUD apparatus 7 (FIG. 8). In this configuration, for example, the target luminance is not an exact target value of luminance but a given luminance range can be used as the target luminance. In view of visibility of a virtual image of a projection image, the target luminance is preferably set higher as brighter around the HUD apparatus 7. The target luminance set by the target luminance input unit 600 is transmitted to the controller 300. Further, the target luminance input unit 600 can be used to input an exact luminance value as the target luminance.

In a case of a vehicle-mounted HUD apparatus, luminance of several thousands to several tens of thousands cd/m² is required under bright environment such as day light, and luminance is required to be reduced at several cd/m² under dark environment such as night and tunnel for viewing a virtual image of projection image, As illustrated in FIG. 3, the lens array 60 is reciprocally scanned by laser beam along the main scanning direction with a high speed and scanned along the sub-scanning direction with a low speed, in which a raster scan is conducted by scanning scan lines extending along the main scanning direction in the sub-scanning direction.

Specifically, by controlling the optical deflection device 40, the laser beam can be moved reciprocally in the main scanning direction (e.g., Y-axis direction) with high speed using resonance of the mirror 40a, and the laser beam can be moved in the sub-scanning direction (e.g., −X direction) at a constant speed without resonance.

Figure 4:
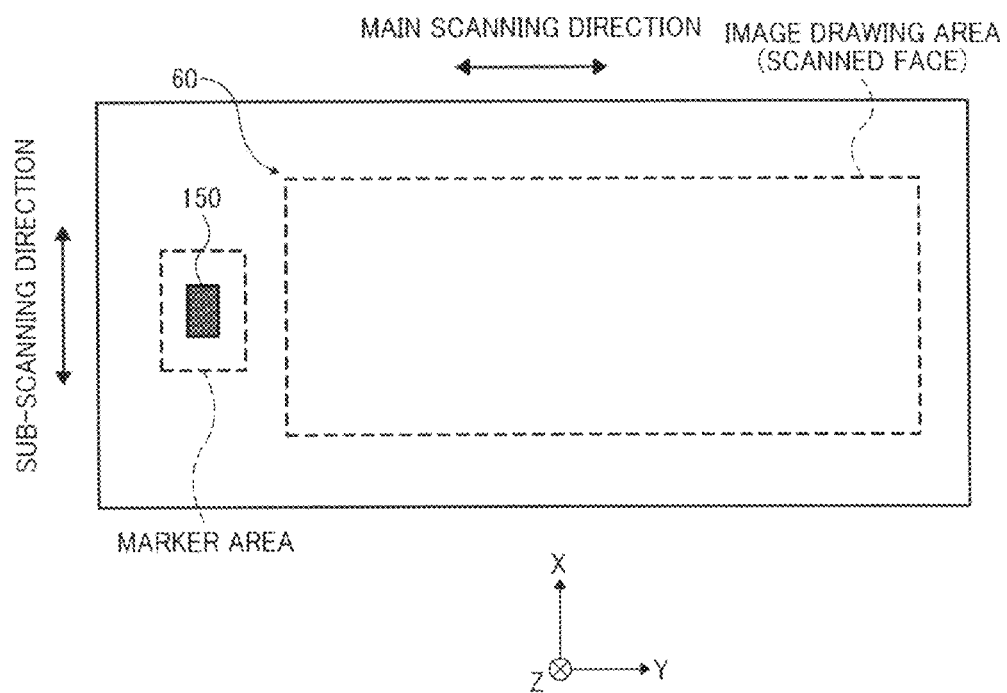
FIG. 4 is a view showing a positional relationship of effective scanning area (image drawing area) on the lens array and a light detector.

As illustrated in FIG. 4, the light detector 150 is, for example, disposed with the lens array 60 by positioning the light detector 150 at a position outside an effective scanning area of the lens array 60 in the main scanning direction. The effective scanning area is an image drawing area where an image is actually drawn or formed, which is a surface (i.e., scanned face) of the lens array 60.

The mirror control unit 400 controls a deflection angle of the mirror 40a so that the laser beam deflected by the optical deflection device 40 enters a marker area including the light detector 150 by setting the light detector 150 in the marker area. Further, because the light detector 150 is disposed at a position outside the image drawing area as described above, even if the laser beam is deflected to the light detector 150, projection image is not affected.

In this configuration, based on detection timing of laser beam at the light detector 150, an amplitude of projection image in the main scanning direction (e.g., Y-axis direction) and the sub-scanning direction (e.g., X-axis direction) can be controlled. Further, based on a detection result (e.g., light quantity and color information) at the light detector 150, the above described white balance adjustment can be conducted. Further, because a maximum deflection angle about the first axis and second axis fluctuates due to some factors such as temperature property of the mirror 40a and structural fluctuation of the mirror drive unit, the amplitude control is conducted to cope with such fluctuations.

To enhance visibility of a virtual image of projection image viewable via the semi-translucent member 70, projection image luminance is required to be adjusted to target luminance corresponding to brightness around the HUD apparatus 7.

Figure 7:
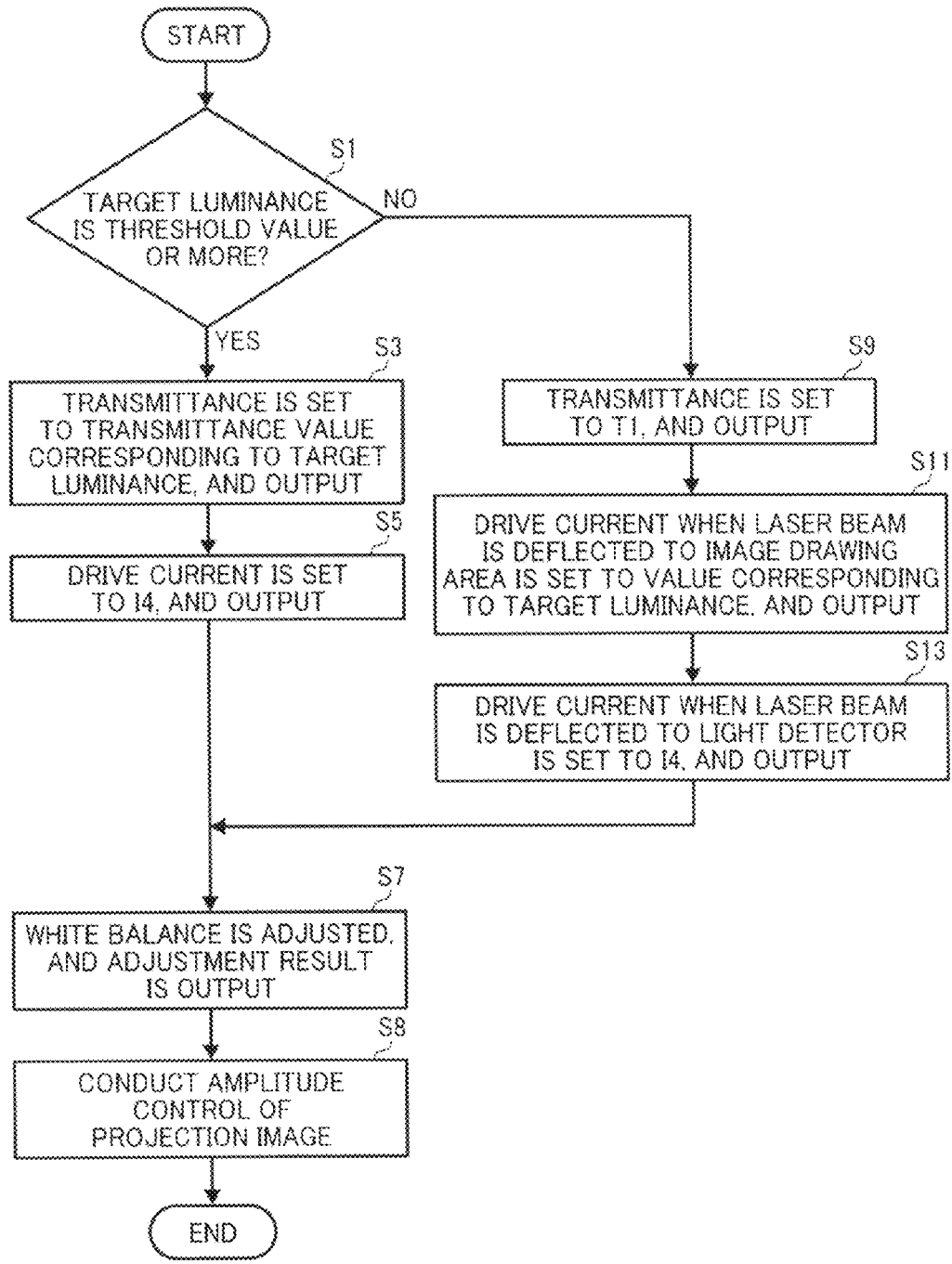
FIG. 7 is a flowchart showing the steps of a control process of a headup display.

A description is given of a control method of the HUD apparatus 7 with reference to FIGS. 7 and 8. FIG. 7 is a flowchart of showing the steps of process algorithm of the controller 300. The controller 300 reads a table illustrated in FIG. 8 from a memory, and controls the light quantity adjustment device 30 and the LD control unit 500 by referring the table.

This control flow can be started when, for example, a driver inputs or sets desired target luminance Lm (m is natural number) using the target luminance input unit 600 in view of brightness level around the HUD apparatus 7. For example, as illustrated in FIG. 8, the target luminance Lm can be set any one of eight target luminance's L1 to L8 set with the order of "L1<L2<L3<L4<L5<L6<L7<L8."

At step S1, it is determined whether the input target luminance Lm is a threshold value TH or more. In this configuration, the threshold value TH is set to a minimum value of luminance that can be detected by the light detector 150 or a value greater than the minimum value for some value, in which the threshold value TH is set based on detection sensitivity of the light detector 150. For example, the threshold value TH is set as "L3<threshold value TH≤L4." In this case, if the input target luminance Lm at step S1 is L4 to L8, determination at step S1 can be affirmed (YES), and then the process proceeds to step S3. If the input target luminance Lm at step S1 is L1 to L3, determination at step S1 cannot be affirmed (NO), then the process proceeds to step S9.

At step S3, transmittance Tn (i.e., adjustment target value of light quantity) is set to a value of transmittance T1 to T5 corresponding to the input target luminance Lm (e.g., L4 to L8), and based on a setting result of transmittance Tn, the light quantity adjustment device 30 is controlled. Specifically, as illustrated in FIG. 8, it is controlled to become transmittance Tn as T1 to T5 for the target luminance L4 to L8, which means the actuator 34 is controlled to position the light passing portions 32a to 32e on a light path of laser beam coming from the light source device 15. Further, if drive current value Ik is set I4 for transmittance T1 to T5, projection image luminance can be adjusted to the target luminance L4 to L8 and laser beam can be detected at the light detector 150 (see FIG. 8).

At step S5, drive current value Ik (i.e., first and second adjustment target values of emission light intensity) is set to I4, and a setting result (e.g., I4) is output to the LD control unit 500. Then, the LD control unit 500 supplies the drive current I4 to each of laser diodes. With this configuration, laser beam (i.e., synthesized light) matched to the drive current I4 can be emitted from the light source device 15, pass through one of the five light passing portions 32a to 32e, and then the laser beam is deflected by the optical deflection device 40 to the lens array 60 and the light detector 150. With this configuration, projection image luminance can be adjusted to the target luminance L4 to L8, and laser beam can be detected by the light detector 150. Upon detecting the laser beam, the light detector 150 outputs a detection result (e.g., light quantity and color information) to the controller 300.

At step S7, as described above, based on the correction-use table and the detection result (e.g., light quantity and color information) received from the light detector 150, white balance is adjusted, and an adjustment result of white balance is output to the LD control unit 500. Then, the LD control unit 500 conducts a fine adjustment of drive current value Ik to be supplied to each of laser diodes based on the adjustment result of white balance to correct white balance of a projection image.

At step S8, based on detection timing of laser beam at the light detector 150, the optical deflection device 40 is controlled to conduct amplitude control of projection image in the main scanning direction and the sub-scanning direction. When step S8 is conducted, the process ends.

At step S9, transmittance Tn (i.e., adjustment target value of light quantity) is set to T1, and based on a setting result of transmittance Tn (e.g., T1), the light quantity adjustment device 30 is controlled. Specifically, as illustrated in FIG. 8, to set transmittance Tn as T1 for the target luminance L1 to L3, the actuator 34 is controlled to position the light passing portion 32a on a light path of laser beam coming from the light source device 15. Further, if drive current value Ik is I1 to I3 for transmittance T1, projection image luminance can be adjusted to the target luminance L1 to L3 (see FIG. 8).

At step S11, drive current value Ik (i.e., first adjustment target value of emission light intensity) when laser beam is deflected to an image drawing area (i.e., scanned face) by the optical deflection device 40 is set to I1 to I3 corresponding to the target luminance L1 to L3, and is output to the LD control unit 500. Then, the LD control unit 500 supplies the drive current I1 to I3 to each of laser diodes. With this configuration, laser beam having intensity matched to the drive current I I1 to I3 can be emitted from each of laser diodes, and enters the lens array 60 via the light passing portion 32a. With this configuration, projection image luminance can be adjusted to the target luminance L1 to L3.

At step S13, drive current value Ik (i.e., second adjustment target value of the emission light intensity) when laser beam is deflected to the light detector 150 by the optical deflection device 40 is set to I4, and a setting result of drive current value Ik (e.g., I4) is output to the LD control unit 500. Then, the LD control unit 500 supplies the drive current I4 to each of laser diodes. With this configuration, laser beam having intensity matched to the drive current I4 can be emitted from each of laser diodes, and pass through the light passing portion 32a, and then the laser beam is deflected to the light detector 150 by the optical deflection device 40. With this configuration, the light detector 150 can detect the laser beam. Upon detecting the laser beam, the light detector 150 outputs a detection result (e.g., light quantity and color information) to the controller 300. When step S13 is conducted, the process proceeds to step S7.

The above described processing can be conducted when target luminance of projection image is changed (or input) each time to adjust projection image luminance at desired luminance.

The above described HUD apparatus 7 includes the light source device 15 having three laser diodes, the optical deflection device 40 that deflects laser beam coming from the light source device 15 to the scanned face such as the surface of the lens array 60, the light detector 150, the light quantity adjustment device 30 that can position the light adjustment member 32 on a light path of laser beam between the light source device 15 and the optical deflection device 40 to adjust light quantity (i.e., light transmittance) of the laser beam, the LD control unit 500 that adjusts emission light intensity of each of laser diodes (i.e., drive current value), and the controller 300. The controller 300 can set the first adjustment target value of emission light intensity (i.e., drive current value Ik) and an adjustment target value of the light quantity (i.e., transmittance Tn) when laser beam is deflected to a scanned face by the optical deflection device 40 based on target luminance Lm of a projection image, and the second adjustment target value of the emission light intensity (i.e., drive current value Ik) when laser beam is deflected to the light detector 150 by the optical deflection device 40 based on the detection sensitivity of the light detector 150 and an adjustment target value of the light quantity (i.e., transmittance Tn).

In this configuration, when laser beam is deflected to the scanned face by the optical deflection device 40, emission light intensity of each of laser diodes can be adjusted to the adjustment target value (e.g., I1 to I4) by the LD control unit 500, and light quantity of laser beam coming from the light source device 15 can be adjusted to the adjustment target value (e.g., T1 to T5) by the light quantity adjustment device 30. With this configuration, projection image luminance can be adjusted to the target luminance of L1 to L8.

Further, when laser beam is deflected to the light detector 150 by the optical deflection device 40, emission light intensity of each of laser diodes can be adjusted to the adjustment target value (e.g., I4) by the LD control unit 500, and light quantity of laser beam coming from the light source device 15 can be adjusted to the adjustment target value (e.g., T1 to T5) by the light quantity adjustment device 30. With this configuration, the light detector 150 can detect laser beam.

With this configuration, as to the HUD apparatus 7, projection image luminance can be adjusted to target luminance, and the light detector can detect laser beam for any levels of target luminance.

As to conventional headup display apparatuses, light quantity of laser beam is adjusted by a light quantity adjustment device (e.g., liquid crystal panel) based on target luminance, and the laser beam is deflected to a scanned face (e.g., surface of translucent screen) and a light detector (e.g., color sensor) by an optical deflection device (e.g., MEMS scanner). Therefore, the light detector cannot detect laser beam depending on level of target luminance such as when the level of target luminance becomes less than the minimum luminance that can be detected by the light detector, in which image quality adjustment and image amplitude control cannot be conducted.

Further, if the target luminance Lm is less than the threshold value TH, set based on the detection sensitivity of the light detector 150, the controller 300 can set the second adjustment target value of emission light intensity greater than the first adjustment target value of emission light intensity, with which the light detector 150 can detect laser beam even if the target luminance Lm is low.

Further, because the controller 300 can set the first adjustment target value of emission light intensity (i.e., drive current value Ik) same or greater than emission light intensity corresponding to the threshold current Ith of laser emission at each of laser diodes, the laser diode can be stably emitted, and projection image luminance can be adjusted stably with high precision.

Further, because the controller 300 can adjust white balance of a projection image based on a detection result at the light detector 150, white balance adjustment can be conducted effectively even if the target luminance Lm is low.

Further, because the controller 300 can control the optical deflection device 40 based on detection timing of laser beam at the light detector 150, image amplitude control can be conducted effectively even if the target luminance Lm is low.

Further, the light quantity adjustment device 30 includes the light adjustment member 32 including the five light passing portions 32a to 32e having different transmittance of laser beam with each other. Therefore, by positioning any one of the five light passing portions 32a to 32e on a light path of laser beam coming from the light source device 15, light quantity of the laser beam can be adjusted to the adjustment target value (Tn).

Further, as to the HUD apparatus 7, a light source employs a laser diode, with which color area can be enlarged and color reproducibility can be enhanced. Further, compared to using a lamp as a light source, power consumption of a laser diode can be reduced greatly, and apparatus size can be smaller.

Further, as to the LD control unit 500, emission light intensity of the three laser diodes LD1 to LD3 can be adjusted independently, with which desired monochrome image and color image can be formed, and color correction such as white balance adjustment can be conducted easily.

Further, as to the HUD apparatus 7, because the lens array 60 (i.e., light translucent member) having a scanned face is disposed on a light path of laser beam deflected by the optical deflection device 40, image light formed on a scanned face can be diffused and passed. With this configuration, a driver can view a virtual image, which is an expanded image formed on the scanned face, via the semi-translucent member 70. Further, occurrence of speckle noise on the semi-translucent member 70 can be reduced. With this configuration, visibility of a virtual image via the semi-translucent member 70 can be enhanced.

A vehicle (e.g., automobile, train) including the above described HUD apparatus 7, and a windshield can be provided. The windshield, used as a light translucent window, is disposed on a light path of light deflected by the optical deflection device 40 and passing the lens array 60 of the HUD apparatus 7 (e.g., −X side of the semi-translucent member 70 in FIG. 1). As to this vehicle, a virtual image having good visibility can be generated or formed through the windshield by the HUD apparatus 7 for any levels of brightness of environment around the HUD apparatus, with which a driver can view information for driving easily. Further, instead of providing the semi-translucent member 70, a windshield of a vehicle can be functioned as the semi-translucent member 70.

Further, instead of the lens array 60, for example, a translucent screen (i.e., light translucent member) can be used. Further, for example, a mirror such as a concave mirror and a flat mirror can be disposed on a light path between the light translucent member (e.g., lens array 60, translucent screen) and the semi-translucent member 70.

As above described, as to the HUD apparatus 7, image quality adjustment and amplitude control of projection image using the light detector 150 can be conducted, and projection image luminance can be adjusted while maintaining suitable white balance for any level of brightness of environment around the apparatus.

Figure 9:
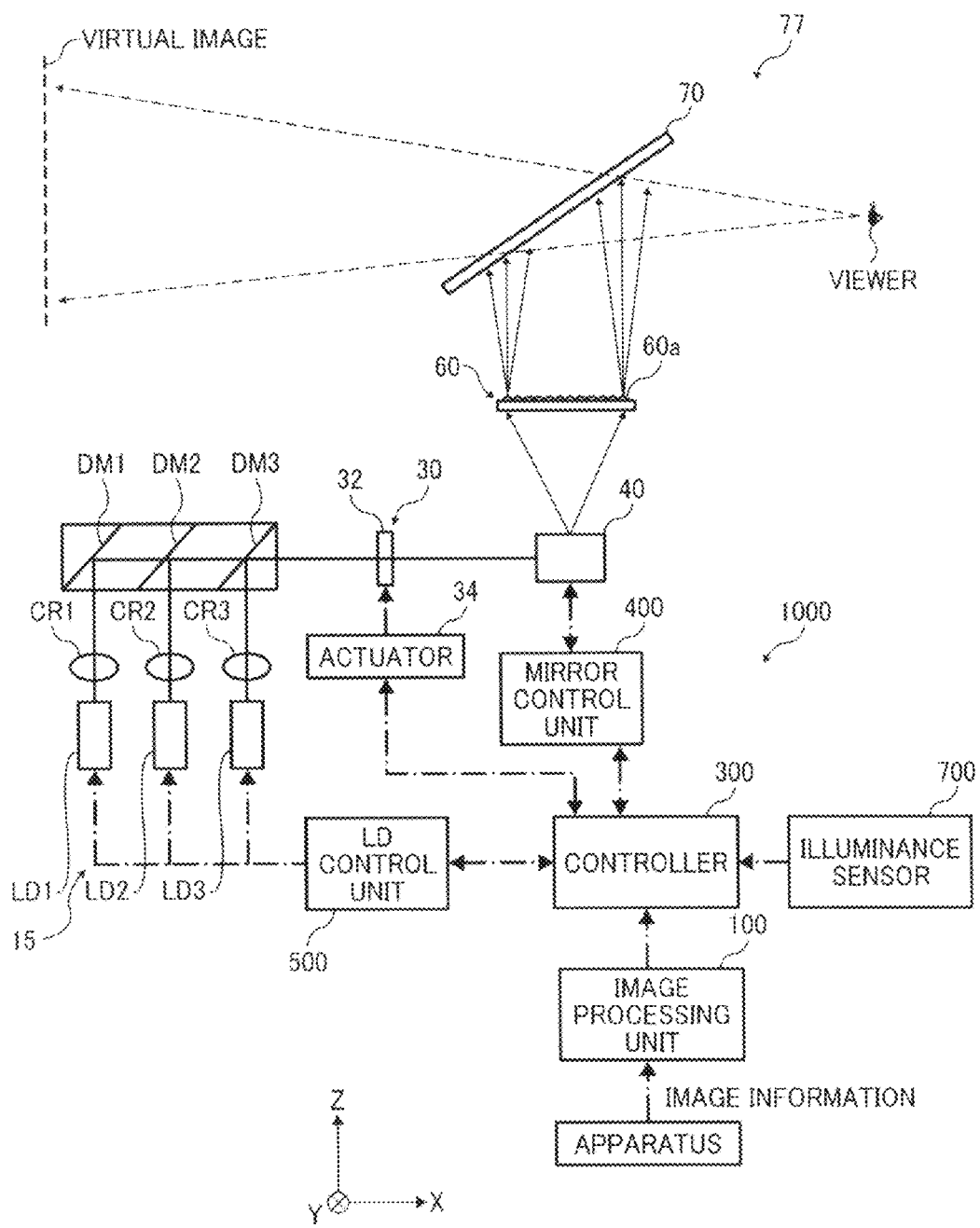
FIG. 9 is a schematic configuration of a headup display apparatus of variant example 1.

Further, the above described HUD apparatus 7 is provided with the target luminance input unit 600 for inputting target luminance manually by a driver or user. Instead of this manual input, an illuminance sensor 700 to measure illuminance around an apparatus can be provided in a HUD apparatus 77 of variant example 1 illustrated in FIG. 9, in which the illuminance sensor 700 outputs a measurement result to the controller 300, and the controller 300 sets a target luminance, with which target luminance can be set automatically.

Figure 10:
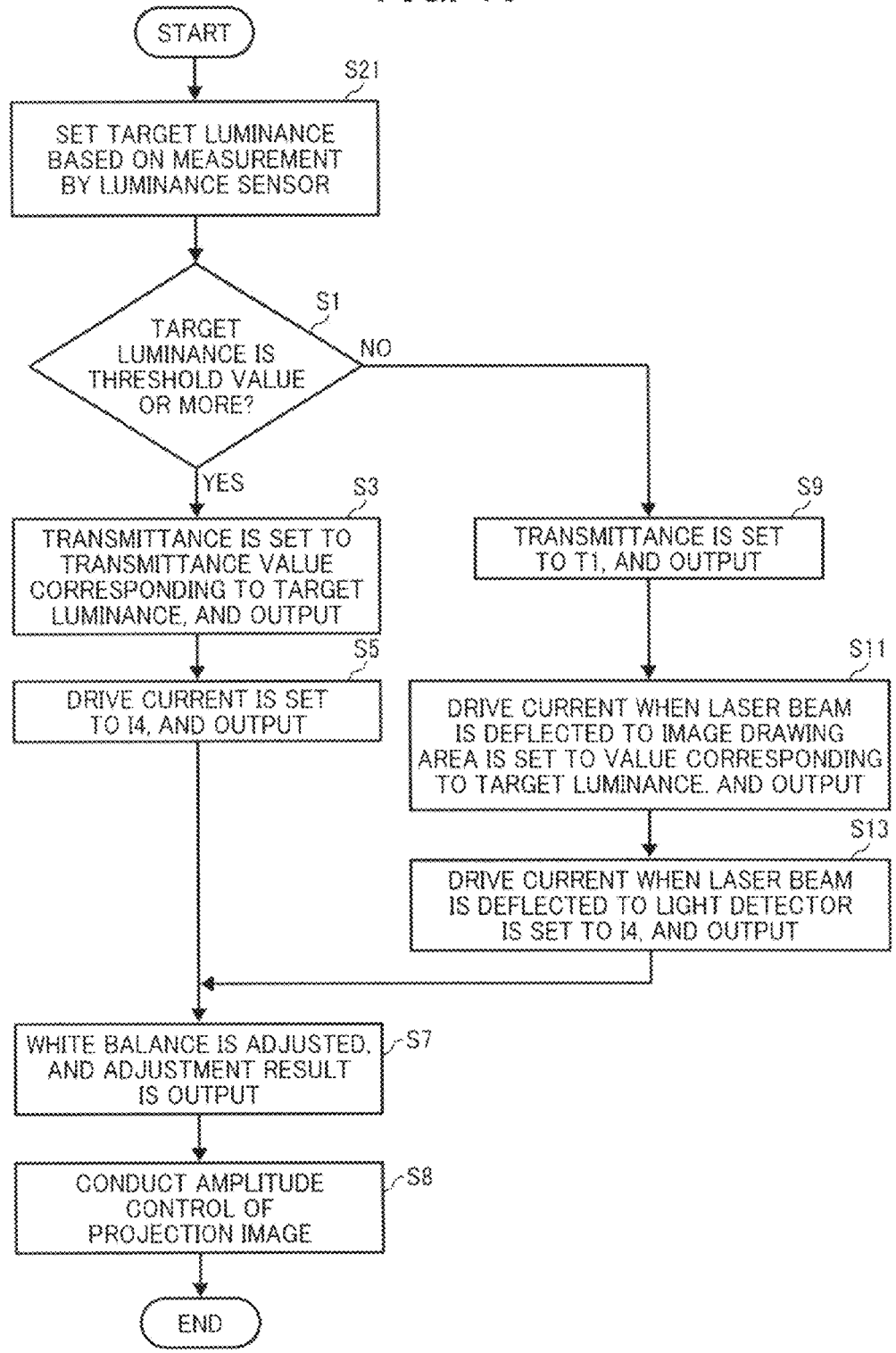
FIG. 10 is a flowchart showing the steps of control process of the headup display of the variant example 1.

The automatic control can be conducted by conducting the steps shown in a flowchart of FIG. 10. In the flowchart shown in FIG. 10, a process of setting target luminance based on a measurement result of the illuminance sensor 700 is conducted as step S21 before step S1 in the flowchart of FIG. 7. Other steps of FIG. 10 are same as the flowchart of FIG. 7.

Figure 11:
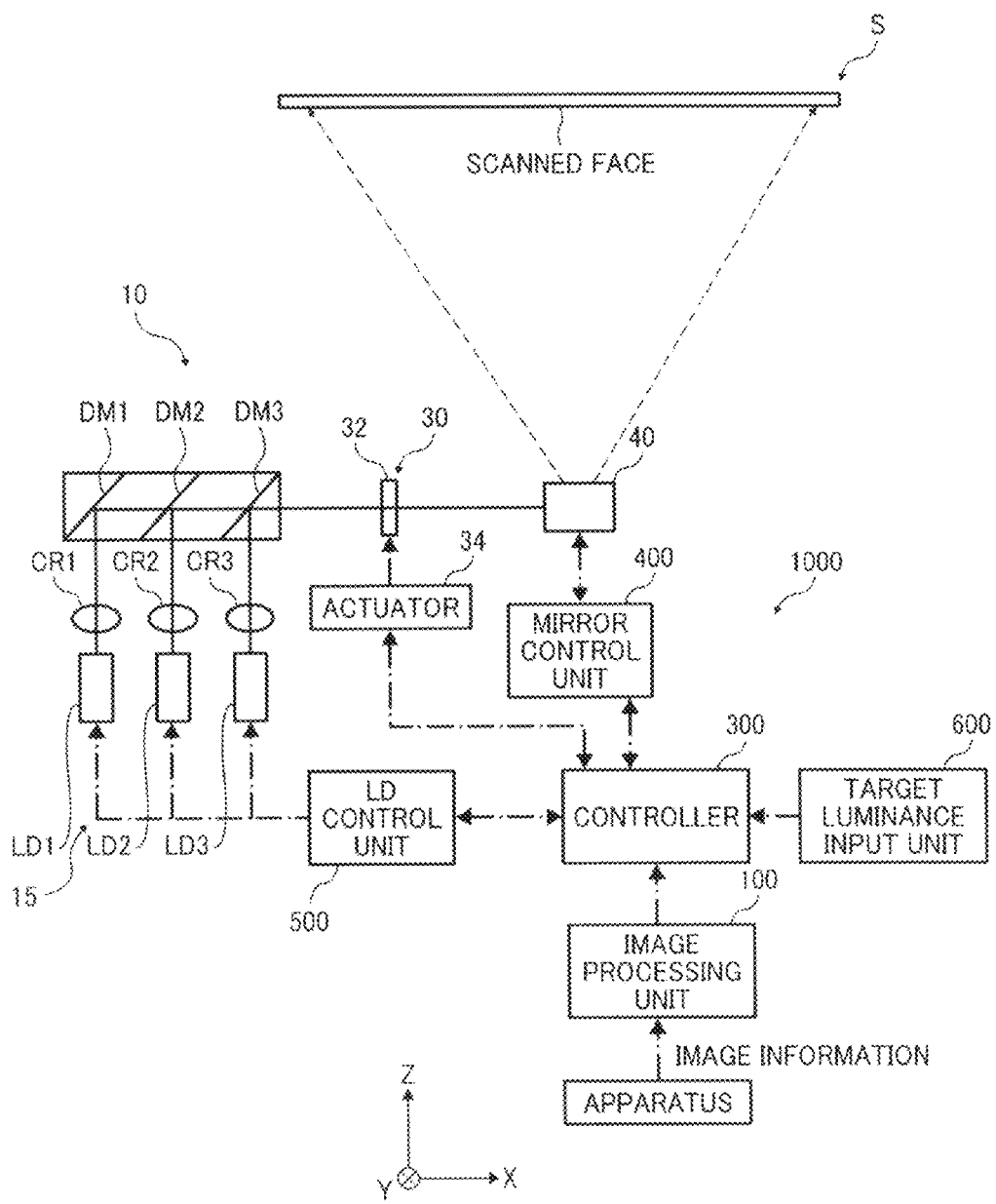
FIG. 11 is a schematic configuration of one example of projector.

Further, in the above described example embodiment and variant example 1, the HUD apparatuses 7 and 77 are described as the image generation apparatus. Further, a projector 10 having a similar configuration of the HUD apparatus 7 can be provided as illustrated in FIG. 11. Further, a projector having a similar configuration of the HUD apparatus 77 can be provided More specifically, as illustrated in FIG. 11, the projector 10 not including the lens array 60 and the semi-translucent member 70 scans a surface of the screen S as a scanned face to generate an image.

As to the projector 10, projection image luminance can be adjusted to target luminance, and the light detector 150 can detect laser beam for any levels of target luminance.

Figure 12:
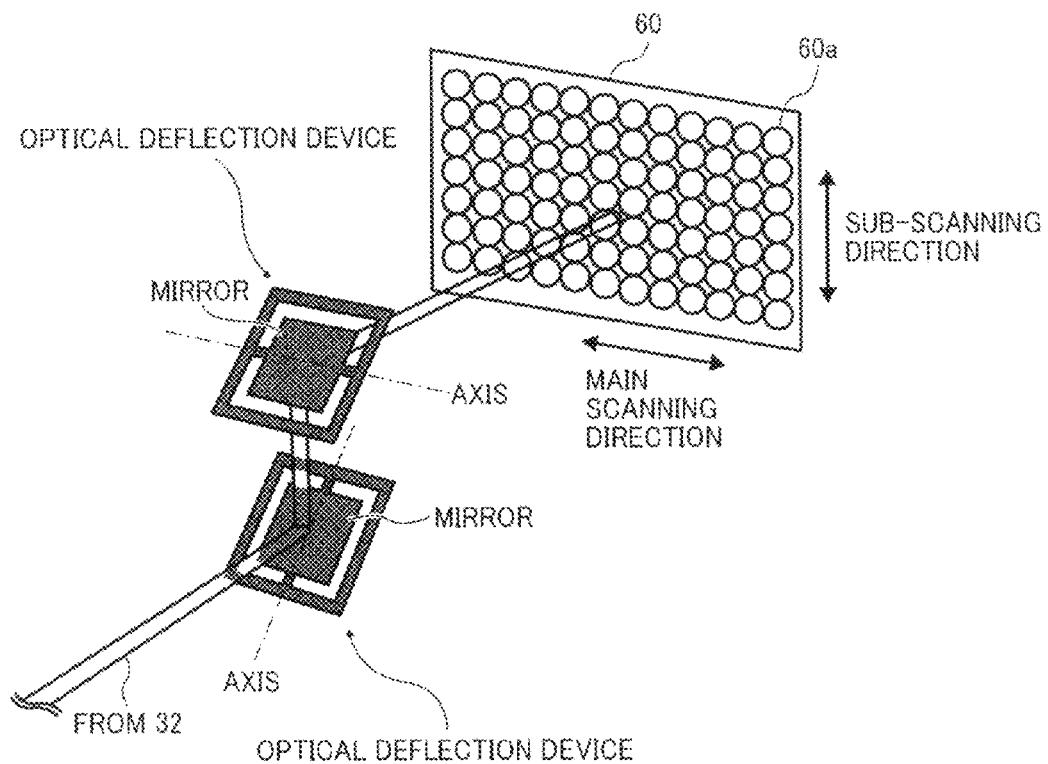
FIG. 12 is another example of an optical deflection device.

Further, in the above described example embodiment and variant example, the optical deflection device employs a MEMS mirror that can oscillate about two axes perpendicular to each other but not limited hereto. For example, as illustrated in FIG. 12, a MEMS mirror that can oscillate about one axis can be used as a plurality of optical deflection devices to scan a scanned face two-dimensionally. Further, for example, an optical deflection device including a MEMS mirror that can oscillate about one axis, an optical deflection device including a galvano mirror that can oscillate about one axis, and an optical deflection device including a polygon mirror that can rotate about one axis can be combined as required.

Figure 13:
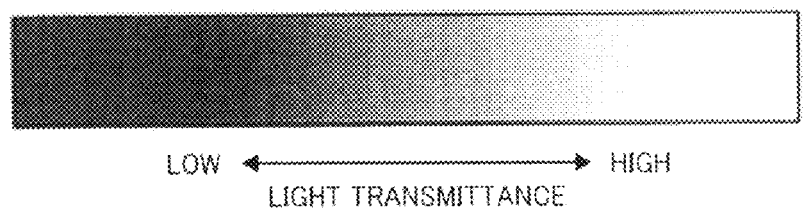
FIG. 13 is another example of a light adjustment member.

Further, in the above described example embodiment and variant example, the light adjustment member employs a configuration arranging a plurality of light passing portions having different transmittance for laser beam with each other in one axis direction but not limited hereto. For example, as illustrated in FIG. 13, a light adjustment member that changes light transmittance gradually or continuously depending on positions in one axis direction can be employed. Further, a light adjustment member having a plurality of light passing portions having different transmittance with each other disposed about one axis can be employed, and this light adjustment member can be rotated about the one axis.

Further, in the above described example embodiment and variant example, as to the light quantity adjustment device, the light adjustment member having a plurality of light passing portions having different transmittance with each other and arranged in one axis direction can be moved in the one axis direction but not limited hereto. For example, a light transmittance variable member that changes laser beam transmittance depending on applied voltage (e.g., liquid crystal panel that changes deflection or polarization angle depending on applied voltage) can be disposed on a light path of laser beam coming from the light source device 15, or on a light path of laser beam emitted from each of laser diodes.

Figure 14:
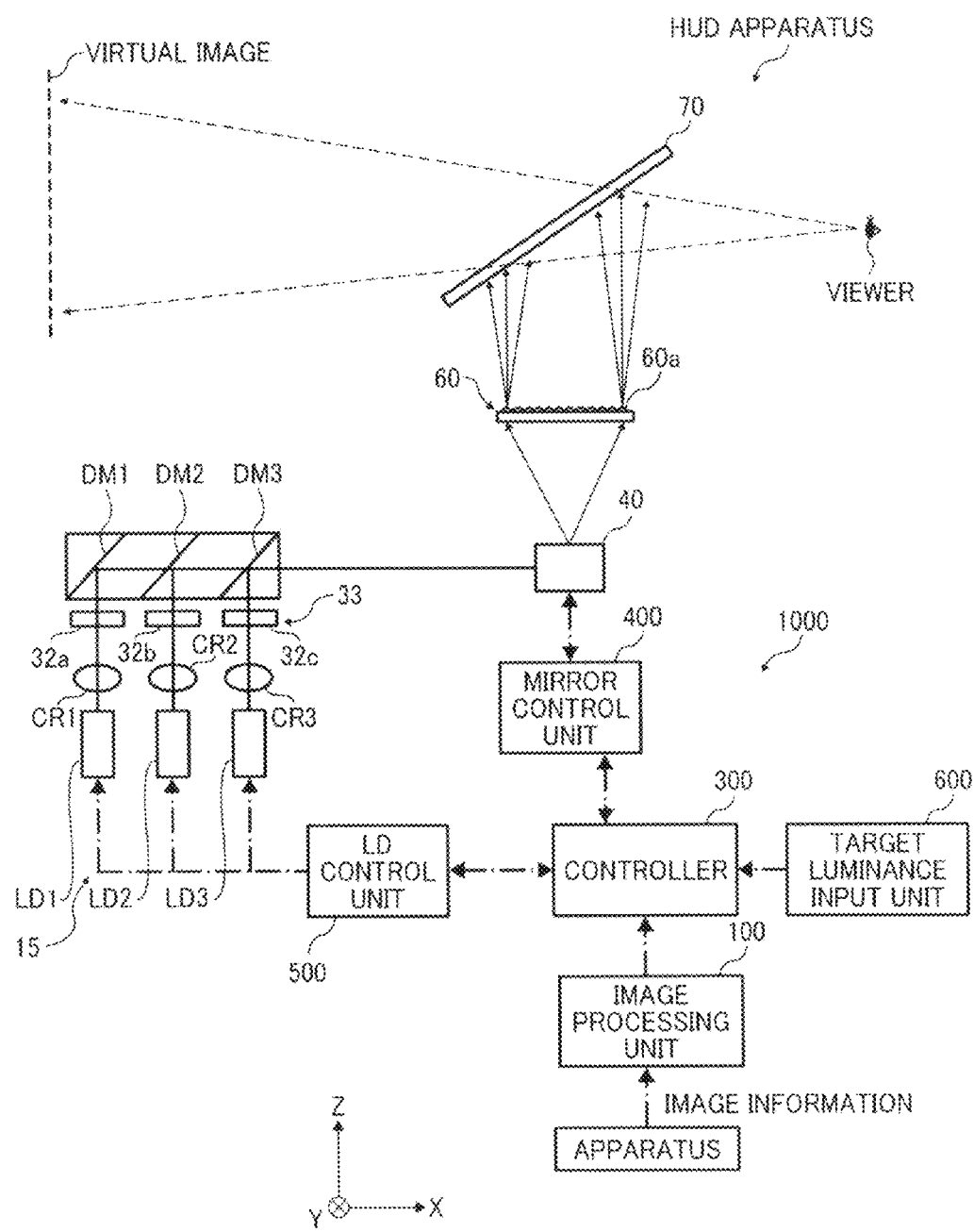
FIG. 14 is a schematic configuration of a headup display apparatus of variant example 2.

Further, in the above described example embodiment and variant example, as to the light quantity adjustment device 30, the light adjustment member 32 is disposed on a light path of laser beam (i.e., synthesized light) coming from the light source device 15 but not limited hereto. For example, as to a light quantity adjustment device 33 of the HUD apparatus of variant example 2 illustrated in FIG. 14, each of light adjustment members 32a, 32b, and 32c can be disposed moveably in Y-axis direction on a light path between each of laser diodes and corresponding dichroic mirrors. In this configuration, light quantity adjustment device 33 can adjust light quantity of laser beam emitted from the three laser diodes LD1 to LD3 independently. With this configuration, correction of image quality (e.g., white balance adjustment) can be conducted by a fine adjustment of light quantity of laser beam emitted from at least one laser diode instead of a fine adjustment of emission light intensity of at least one laser diode, or by a combination of the fine adjustment of emission light intensity of at least one laser diode and the fine adjustment of light quantity of laser beam from at least one laser diode.

Further, in the above described example embodiment, the lens array employs a plurality of micro lenses having a circular shape arranged in matrix or a lattice pattern when viewed from −Z direction but not limited hereto. For example, the lens array can employ a plurality of micro lenses having an N-polygonal shape (N is three or more) arranged in a lattice pattern or a staggered pattern when viewed from −Z direction.

Further, in the above described example embodiment and variant example, the main scanning direction is set to Y-axis direction and the sub-scanning direction is set to X-axis direction but not limited hereto. For example, the main scanning direction can be set to X-axis direction and the sub-scanning direction can be set to Y-axis direction.

Further, in the above described example embodiment and variant example, the configuration of the light source device 15 can be changed as required. For example, in the above described example embodiment and variant example, the light source uses three laser diodes but not limited hereto. For example, the light source can use two or less laser diodes, and four or more laser diodes. Further, the number of dichroic mirrors can be changed depending on the number of laser diodes such as zero. For example, when one laser diode is used, a dichroic mirror is not required. Further, instead of a dichroic mirror, a light synchronization prism can be used.

Further, in the above described example embodiment and variant example, a collimate lens is disposed for each of laser diodes, but the collimate lens can be omitted.

Further, the light source unit can include, for example, a lens or a mirror disposed at least on a light path of laser beam between the dichroic mirror DM3 and the light adjustment member 32 and on a light path of laser beam between the light adjustment member 32 and the optical deflection device 40.

Further, in the above described example embodiment, the HUD apparatus 7 obtains image information from the image data output apparatus but not limited hereto. For example, instead of the image data output apparatus, the HUD apparatus 7 can include a memory such as a storage medium or carrier medium storing image information.

Further, in the above described example embodiment, the light detector is disposed at a position outside the image drawing area in the main scanning direction but not limited hereto. For example, the light detector can be disposed at a position outside the image drawing area in the sub-scanning direction. Further, the light detector can be disposed at a position outside the image drawing area in the main scanning direction and the sub-scanning direction (e.g., near a corner of the lens array 60).

Further, in the above described example embodiment, a semiconductor laser employs a laser diode such as an edge emitting laser, but not limited hereto. For example, a surface emitting laser such as a vertical cavity surface emitting laser (VCSEL) can be employed as a semiconductor laser.

Further, the light detector 150 is integrally provided with the lens array 60, but the light detector 150 can be separated from the lens array 60.

Further, in the flowcharts of FIGS. 7 and 10, the order of steps S3 and S5 can be switched, the order of steps S7 and S8 can be switched, and the order of steps S9, S11, and S13 can be changed as required.

Further, in the above described example embodiment, the controller 300 includes a memory storing the table illustrated in FIG. 8, but the memory can be an external memory disposed outside the controller 300. Further, the number and value of parameters of the table illustrated in FIG. 8 are one example and not limited hereto. For example, the number and value of parameters of the table can be changed as required, for example, depending on specification of HUD apparatus, use environment of HUD apparatus or the like.

As to the above described example embodiment, image luminance can be adjusted to target luminance and a light detector can detect laser beam for any levels of target luminance, and an image generation apparatus having this configuration can be provided.

The present invention can be implemented in any convenient form, for example using dedicated hardware, or a mixture of dedicated hardware and software. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:
1. An image generation apparatus comprising:
    a light source device having at least one semiconductor laser that emits a laser beam;
    an optical deflection device to deflect the laser beam from the light source device to a scanned face to generate an image thereon, and to a light detector;
    a light quantity adjustment device including a member disposable on a light path of the laser beam between the semiconductor laser and the optical deflection device to adjust a light quantity of the laser beam; and
    processing circuitry to
        adjust an emission light intensity of the semiconductor laser,
        set a first adjustment target value of the emission light intensity, which is an adjustment target value of the emission light intensity, and an adjustment target value of the light quantity when the laser beam is deflected to the scanned face by the optical deflection device based on a target luminance of the image, and set a second adjustment target value of the emission light intensity, which is an adjustment target value of the emission light intensity, when the laser beam is deflected to the light detector by the optical deflection device based on the adjustment target value of the light quantity and a detection sensitivity of the light detector, wherein the processing circuitry sets the second adjustment target value of the emission light intensity greater than the first adjustment target value of the emission light intensity, when the target luminance is less than a threshold value set based on the detection sensitivity of the light detector.

2. The image generation apparatus of claim 1, wherein the processing circuitry sets the first adjustment target value of the emission light intensity to a value equal to or greater than an emission light intensity generate-able by a threshold current used for laser emission by the semiconductor laser.

3. The image generation apparatus of claim 1, wherein the processing circuitry adjusts a white balance of the image based on a detection result of the light detector.

4. The image generation apparatus of claim 1, wherein the processing circuitry controls the optical deflection device based on a detection timing of the laser beam detected by the light detector.

5. The image generation apparatus of claim 1, further comprising a target luminance setting sensor to measure illuminance around the image generation apparatus, wherein the processing circuitry sets the target luminance based on a result of the measured illuminance.

6. The image generation apparatus of claim 1, wherein the light quantity adjustment device includes a member having a plurality of light passing portions, each portion having a different transmittance for the laser beam.

7. The image generation apparatus of claim 1, wherein the light quantity adjustment device includes a light transmittance variable member that changes transmittance of the laser beam depending on an applied voltage.

8. The image generation apparatus of claim 1, wherein the at least one semiconductor laser is a plurality of semiconductor lasers, and the light quantity adjustment device adjusts the light quantity of the laser beam emitted from the plurality of semiconductor lasers for each one of the plurality of semiconductor lasers independently.

9. The image generation apparatus of claim 1, wherein the at least one semiconductor laser is a plurality of semiconductor lasers, and the processing circuitry adjusts the emission light intensity of each laser beam emitted from each of the plurality of semiconductor lasers independently.

10. The image generation apparatus of claim 1, further comprising a light translucent member disposed on the light path of the laser beam deflected by the optical deflection device, the light translucent member having the scanned face.

11. A vehicle comprising:
the image generation apparatus of claim 10, and
a light translucent window disposed on the light path of the laser beam deflected by the optical deflection device of the image generation apparatus and passed through the light translucent member.

12. A method of controlling of an image generation apparatus generating an image by scanning a scanned face using a laser beam, the image generation apparatus including a light source device having at least one semiconductor laser that emits the laser beam; an optical deflection device to deflect the laser beam from the light source device to the scanned face to generate the image, and to a light detector; a light quantity adjustment device including a member disposable on a light path of the laser beam between the semiconductor laser and the optical deflection device to adjust a light quantity of the laser beam; and processing circuitry to adjust an emission light intensity of the semiconductor laser, the method comprising:

setting a first adjustment target value of the emission light intensity, which is an adjustment target value of the emission light intensity, and an adjustment target value of the light quantity when the laser beam is deflected to the scanned face by the optical deflection device based on a target luminance of the image; and setting a second adjustment target value of the emission light intensity, which is an adjustment target value of the emission light intensity, when the laser beam is deflected to the light detector by the optical deflection device based on the adjustment target value of the light quantity and a detection sensitivity of the light detector, wherein the setting of the second adjustment target value sets the second adjustment target value of the emission light intensity greater than the first adjustment target value of the emission light intensity, when the target luminance is less than a threshold value set based on the detection sensitivity of the light detector.

13. A non-transitory computer-readable storage medium storing a program that, when executed by a computer having a processing circuit, causes the computer to execute a method of controlling an image generation apparatus, the image generation apparatus including a light source device having at least one semiconductor laser that emits a laser beam; an optical deflection device to deflect the laser beam from the light source device to a scanned face to generate an image, and to a light detector; a light quantity adjustment device including a member disposable on a light path of the laser beam between the semiconductor laser and the optical deflection device to adjust a light quantity of the laser beam; and processing circuitry to adjust an emission light intensity of the semiconductor laser, the method comprising:

setting a first adjustment target value of the emission light intensity, which is an adjustment target value of the emission light intensity, and an adjustment target value of the light quantity when the laser beam is deflected to the scanned face by the optical deflection device based on a target luminance of the image; and setting a second adjustment target value of the emission light intensity, which is an adjustment target value of the emission light intensity, when the laser beam is deflected to the light detector by the optical deflection device based on the adjustment target value of the light quantity and a detection sensitivity of the light detector, wherein the setting of the second adjustment target value sets the second adjustment target value of the emission light intensity greater than the first adjustment target value of the emission light intensity, when the target luminance is less than a threshold value set based on the detection sensitivity of the light detector.

* * * * *